United States Patent
Belzer et al.

(10) Patent No.: US 8,417,534 B2
(45) Date of Patent: Apr. 9, 2013

(54) AUTOMATED LOCATION-BASED INFORMATION RECALL

(75) Inventors: William A. Belzer, Grimes, IA (US); Todd A. Peterson, Johnston, IA (US); Douglas L. Gardner, Johnston, IA (US); Warren Richardson, Johnston, IA (US); Barry Anderson, Lake Crystal, MN (US); Dana Torquil Terndrup, West Des Moines, IA (US); Tracy Hershey, Johnston, IA (US); Steven J. Corak, Johnston, IA (US); David K. Langer, Urbandale, IA (US); David Bowen, Grimes, IA (US)

(73) Assignee: Pioneer Hi-Bred International, Inc., Johnston, IA (US)

(*) Notice: Subject to any disclaimer, the term of this patent is extended or adjusted under 35 U.S.C. 154(b) by 572 days.

(21) Appl. No.: 11/962,237

(22) Filed: Dec. 21, 2007

(65) Prior Publication Data
US 2008/0157990 A1    Jul. 3, 2008

Related U.S. Application Data

(60) Provisional application No. 60/882,756, filed on Dec. 29, 2006.

(51) Int. Cl.
G06Q 10/00 (2012.01)
G06Q 30/00 (2012.01)
G06K 9/00 (2006.01)
G08B 1/08 (2006.01)

(52) U.S. Cl.
USPC ......... 705/1.1; 705/7.15; 705/7.38; 705/7.36; 705/7.12; 705/7.41; 382/110; 340/539.13

(58) Field of Classification Search .................. 340/678; 701/50; 702/5
See application file for complete search history.

(56) References Cited

U.S. PATENT DOCUMENTS

| | | | |
|---|---|---|---|
| 2,446,509 A | 8/1948 | Fischer | |
| 3,727,345 A | 4/1973 | Smith | |

(Continued)

FOREIGN PATENT DOCUMENTS

| | | |
|---|---|---|
| WO | WO 97/09696 A1 | 3/1997 |
| WO | WO 01/33505 A2 | 5/2001 |

OTHER PUBLICATIONS

International Search Report, Pioneer Hi-Bred International, Inc., PCT/US07/88510, Dec. 21, 2007, 2 pages.
"Assessing the Composition of Dairy Products and Grain by Near Infrared", Chemometrics Applications Overview, InfoMetrix, Inc., Oct. 1996, 4 pages.
"Classification of Maize Environments using Crop Simulation and GIS", Pioneer Crop Genetics Research, presented at CIMMYT, Apr. 15-16, 2003.

(Continued)

*Primary Examiner* — Jennifer Mehmood
*Assistant Examiner* — Pameshanand Mahase
(74) *Attorney, Agent, or Firm* — Woodcock Washburn LLP

(57) ABSTRACT

A geoposition is determined at a point using a geoposition determining mobile communication device. A crop management zone is identified based on one or more predetermined crop management boundaries and the geoposition of the point. Information about the field is wirelessly communicated between the geoposition determining mobile communications device and a remote site. Analysis may be performed at the remote site with the results of the analysis communicated to the mobile communication device at the growing point. Information may be collected at the point which is stored or analyzed at the remote site. Information may include digital images of plant conditions which may be analyzed to determine conditions such as disease or pest infestation. Contextual information from a number of different types of sources may be used to provide meaningful analysis and feedback to the producer. The producer may define crop management zones using the geoposition determining mobile communication device.

25 Claims, 9 Drawing Sheets

U.S. PATENT DOCUMENTS

| | | | |
|---|---|---|---|
| 4,159,596 A | 7/1979 | Downing | |
| 4,291,082 A | 9/1981 | Stall | |
| 4,554,761 A | 11/1985 | Tell | |
| 5,492,547 A | 2/1996 | Johnson | |
| 5,538,880 A | 7/1996 | Lundquist et al. | |
| 5,689,914 A | 11/1997 | Greaves et al. | |
| 5,897,619 A | 4/1999 | Hargrove, Jr. et al. | |
| 5,978,723 A | 11/1999 | Hale et al. | |
| 6,100,093 A | 8/2000 | Van Kooten et al. | |
| 6,141,904 A | 11/2000 | Greaves et al. | |
| 6,212,824 B1* | 4/2001 | Orr et al. | 47/58.1 R |
| 6,282,835 B1 | 9/2001 | Richtsmeier | |
| 6,338,040 B1 | 1/2002 | Buman et al. | |
| 6,433,146 B1 | 8/2002 | Cheryan | |
| 6,505,146 B1 | 1/2003 | Blackmer | |
| 6,549,852 B2* | 4/2003 | Hanson | 702/2 |
| 6,691,135 B2 | 2/2004 | Pickett et al. | |
| 6,778,872 B2 | 8/2004 | Jorgenson et al. | |
| 6,865,556 B2 | 3/2005 | Penner et al. | |
| 6,990,459 B2 | 1/2006 | Schneider | |
| 7,039,592 B1 | 5/2006 | Yegge et al. | |
| 7,047,135 B2 | 5/2006 | Dyer et al. | |
| 7,167,797 B2 | 1/2007 | Faivre et al. | |
| 7,184,892 B1 | 2/2007 | Dyer et al. | |
| 7,193,128 B2 | 3/2007 | Copenhaver et al. | |
| 7,263,210 B2* | 8/2007 | Kummel | 382/110 |
| 7,321,310 B2 | 1/2008 | Curkendall et al. | |
| 7,844,475 B1 | 11/2010 | Murphy | |
| 2002/0059091 A1 | 5/2002 | Hay et al. | |
| 2002/0082982 A1 | 6/2002 | Mock et al. | |
| 2002/0103688 A1 | 8/2002 | Schneider | |
| 2002/0107723 A1 | 8/2002 | Benjamin et al. | |
| 2002/0173980 A1 | 11/2002 | Daggett et al. | |
| 2002/0183867 A1 | 12/2002 | Gupta et al. | |
| 2003/0004837 A1 | 1/2003 | Myers et al. | |
| 2003/0083819 A1 | 5/2003 | Rooney et al. | |
| 2003/0125877 A1* | 7/2003 | Hanson | 702/5 |
| 2003/0126635 A1 | 7/2003 | Penner et al. | |
| 2003/0129973 A1* | 7/2003 | Oishi et al. | 455/414 |
| 2003/0182144 A1* | 9/2003 | Pickett et al. | 705/1 |
| 2003/0212604 A1 | 11/2003 | Cullen | |
| 2003/0229435 A1* | 12/2003 | Van der Lely | 701/50 |
| 2003/0236724 A1 | 12/2003 | Baranova et al. | |
| 2004/0073556 A1 | 4/2004 | Wood et al. | |
| 2004/0132370 A1 | 7/2004 | Schroder | |
| 2004/0133347 A1 | 7/2004 | Britt | |
| 2004/0210509 A1 | 10/2004 | Eder | |
| 2004/0215556 A1 | 10/2004 | Merkley et al. | |
| 2005/0004682 A1 | 1/2005 | Gaddis et al. | |
| 2005/0027572 A1 | 2/2005 | Goshert | |
| 2005/0050796 A1 | 3/2005 | Wilkin | |
| 2005/0096849 A1 | 5/2005 | Sorrells | |
| 2005/0125260 A1 | 6/2005 | Green et al. | |
| 2005/0150160 A1 | 7/2005 | Norgaard et al. | |
| 2005/0153687 A1* | 7/2005 | Niemenmaa et al. | 455/414.2 |
| 2005/0208925 A1* | 9/2005 | Panasik et al. | 455/404.1 |
| 2005/0283314 A1 | 12/2005 | Hall | |
| 2006/0015253 A1 | 1/2006 | Ochs et al. | |
| 2006/0015360 A1 | 1/2006 | Ochs et al. | |
| 2006/0030990 A1 | 2/2006 | Anderson et al. | |
| 2006/0074560 A1 | 4/2006 | Dyer et al. | |
| 2006/0095314 A1 | 5/2006 | Wu et al. | |
| 2006/0106539 A1 | 5/2006 | Choate et al. | |
| 2006/0282295 A1 | 12/2006 | McComb et al. | |
| 2006/0282467 A1* | 12/2006 | Peterson et al. | 707/104.1 |
| 2006/0287896 A1* | 12/2006 | McComb et al. | 705/4 |
| 2007/0174095 A1 | 7/2007 | McComb et al. | |
| 2008/0040165 A1 | 2/2008 | Anderson et al. | |
| 2010/0306012 A1 | 12/2010 | Zyskowski et al. | |

OTHER PUBLICATIONS

"Fieldstar Advanced Precision Farming System", AGCO Limited, 2001, 16 pages.

"Fieldstar—Maximizing Farm Profitability and Improving Environmental Practices", AGCO Corporation, retrieved from website archived Jun. 30, 2004, 2 pages.

"Self Pollination Auto Fecondation", Sales page, OSMOLUX: Emerging Technologies—No Contamination, No Rotting, Jun. 18, 2003, 1 page.

Cooper et al., "Integrating Breeding Tools to Generate Information for Efficient Breeding: Past, Present, and Future", International Symposium on Plant Breeding, Aug. 17-22, 2003.

Davis, "Corn Milling, Processing and Generation of Co-Products", Minnesota Nutrition Conference, Minnesota Corn Growers Association, Sep. 11, 2001, 7 pages.

Doehlert et al., "Genotypic and Environmental Effects on Grain Yield and Quality of Oat Grown in North Dakota", Crop Science, Jul.-Aug. 2001, 41, 1066-1072.

Haefele et al., "Selection and Optimization of Corn Hybrids for Fuel Ethanol Production", American Seed Trade Association's Proceedings of the 59th Annual Corn and Sorghum Research Conference, Dec. 2004, 21 pages.

Hume, "A Possible New Method for the Control of Pollen in Corn", Journal of the American Society of Agronomy, Mar. 1941, 33(3), 265-266.

Lawton, "Buy into bundling benefits", Farm Industry News, Mar. 15, 2002, 4 pages.

Loffler, "Characterization of Maize Environments Using Crop Simulation and GIS", Presented at University of Florida, Sep. 9, 2004, 47 pages.

Loffler, "Classification of Maize Environments using Crop Simulation and Geographic Information Systems", ASTA Annual Corn and Sorghum Research Conference, Dec. 9, 2004, 28 pages.

Loffler, "New Methodologies for Managing Genotype by Environment Interaction", VIII Congreso Nacional de Maiz, Rosario, Argentina, Nov. 16-18, 2005.

Mazur et al., "Gene Discovery and Product Development for Grain Quality Traits", Science, Jul. 16, 1999, 285(5426), 372-374.

PCT Application No. PCT/US2006/22917 : International Search Report of the International Searching Authority, Jul. 24, 2007, 2 pages.

PCT Application No. PCT/US2007/88510 : International Search Report of the International Searching Authority, Jun. 10, 2008, 1 page.

Semchenko et al., "The Effect of Breeding on Alometry and Phenotypic Plasticity in Four Varieties of Oat", Field Crops Research, Sep. 14, 2005, 93(2-3), 33 pages.

Thomison, "Cultural Practices for Optimizing Maize Seed Yield and Quality in Production Fields", M.B. McDonald and S. Contreras (ed.) Proceedings International Seed Seminar: Trade, Production and Technology, Oct. 15-16, 2002, 49-55.

Tiffany et al., "Factors Associated with Success of Fuel Ethanol Products", Staff Paper P03-7, Department of Applied Economics, College of Agricultural, Food, and Environmental Sciences, University of Minnesota, Aug. 2003, 62 pages.

Wehling et al., "Prediction of Corn Dry-Milling Quality by Near-Infrared Spectroscopy", Cereal Chemistry, Jun. 1996, 73(5), 543-546.

Wei et al., "Impact of Genotype and Environment on Historical Corn Production in the USA". ASA Annual Meeting, Las Vegas, Nevada, Nov. 2003.

"Grain Grading Standards in Feed Manufacturing," Kansas State University Agricultural Experiment Station and Cooperative Extension Service, Department of Grain Science and Industry, Jan. 1997, MF-2034, 12 pages.

"Grain Inspection Handbook. Book II, Chapter 2: Barley", U.S. Department of Agriculture. Grain Inspection, Packers and Stockyards Administration. Federal Grain Inspection Service, Aug. 9, 2004, 36 pages.

Kelley, Christopher, "Agricultural Production Contrats: Drafting Considerations" 18 Hamline L.R. 397 (1975).

Morris, C.F.: "Grain Quality—Idaho Wheat Production Guide", University of Idaho College of Agricultural and Life Sciences, Jan. 2004, p. 6-9.

"Quality Characteristics of Grains" retrieved from <http"//www.fao.org/docrep/T1838E/T18380h.htm> archived Dec. 14, 2001, 2 pages.

* cited by examiner

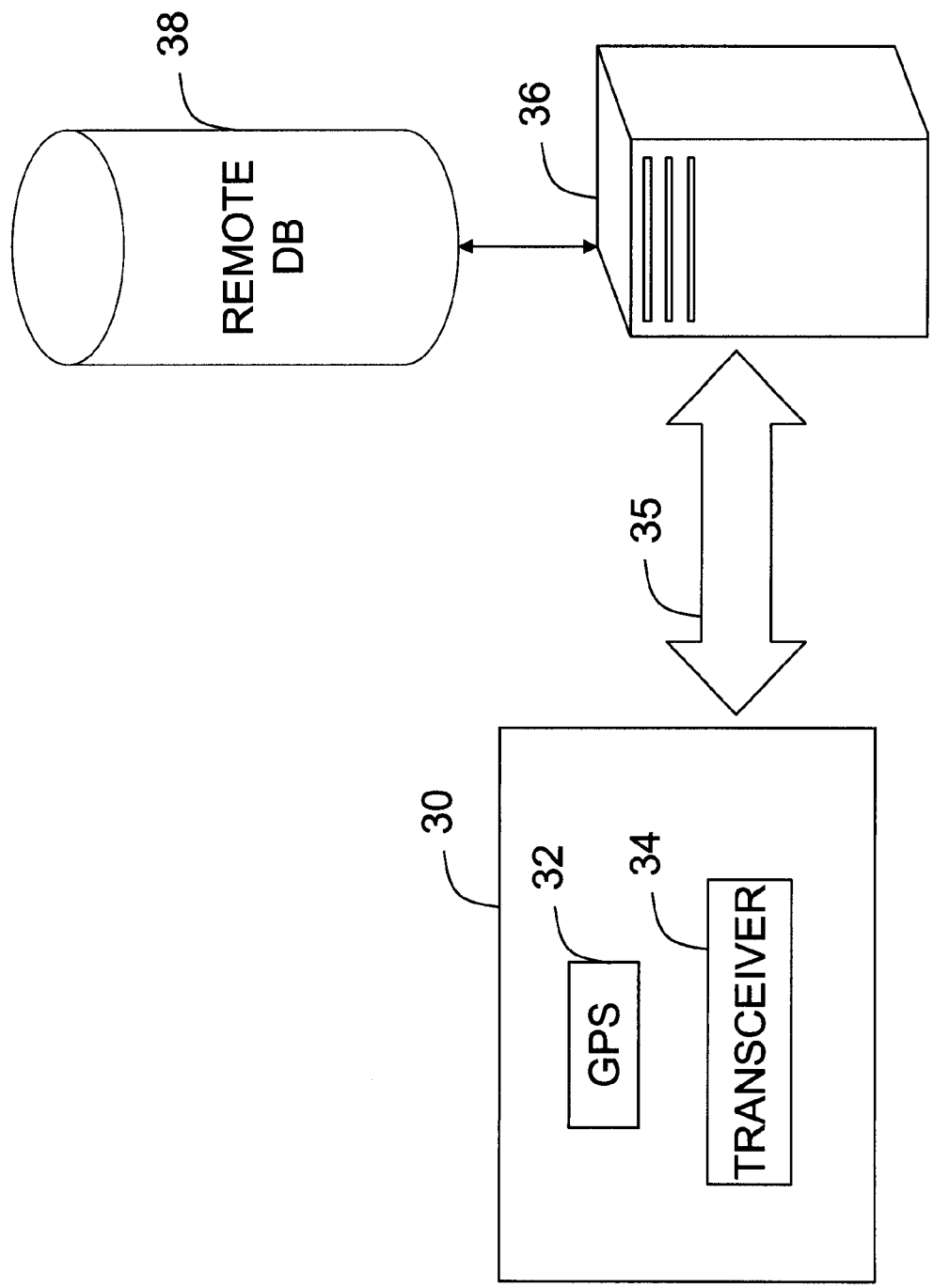

You are now entering the field known as "Gobbler's Knob".

FIG. 4A

Warning! Seed planted Here does not include the GLYPHOSATE RESISTANCE trait. DO NOT APPLY GLYPHOSATE HERBICIDE!

FIG. 4B

Caution! Heavy rain Expected. DO NOT SPRAY.

FIG. 4C

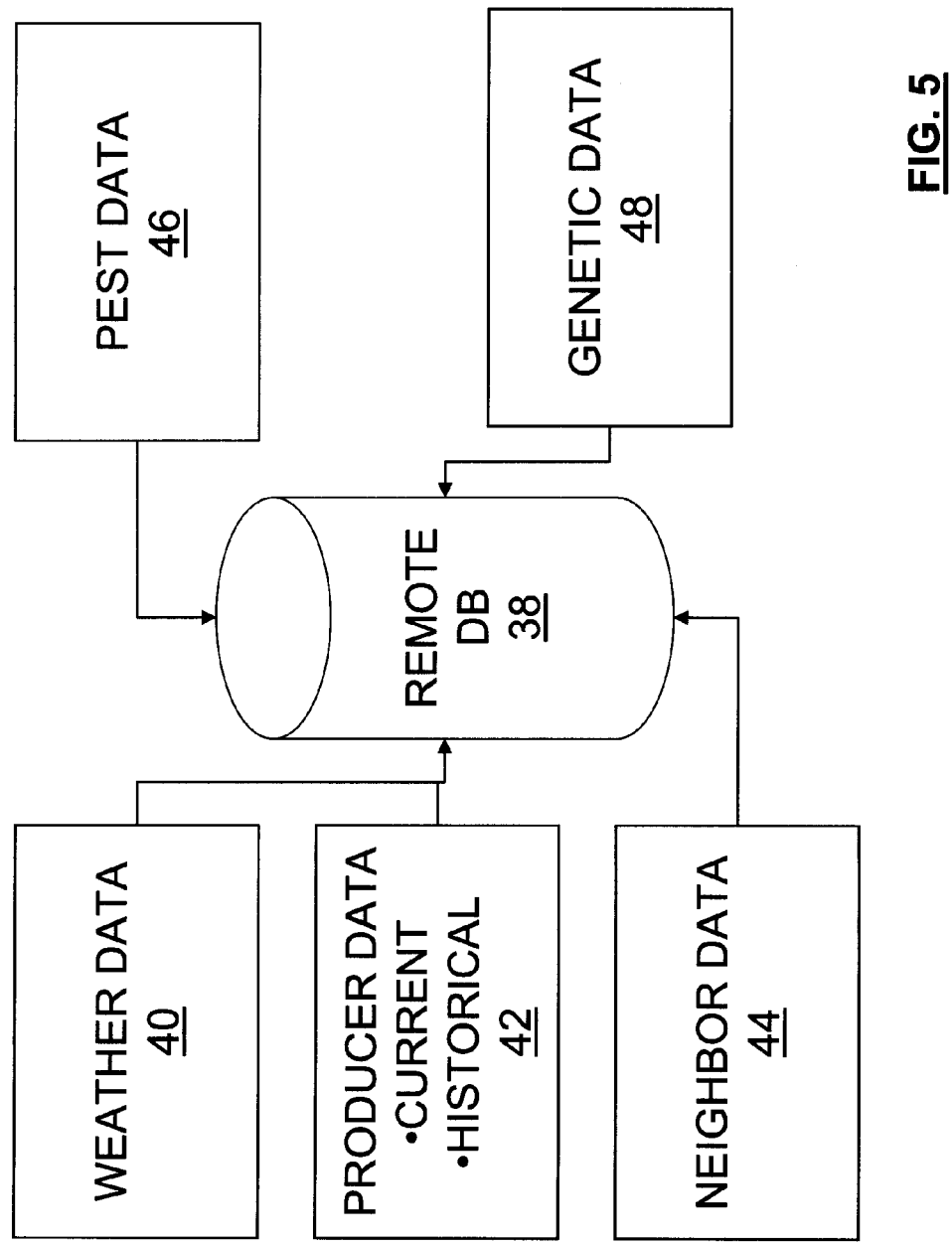

AUTOMATED LOCATION-BASED INFORMATION RECALL

CROSS-REFERENCE TO RELATED APPLICATIONS

This application claims priority to U.S. Provisional Application Ser. No. 60/882,756 filed Dec. 29, 2006, herein incorporated by reference in its entirety.

FIELD OF THE INVENTION

The present invention includes various methods and systems relating to data collection, record keeping and analysis used in land management activities such as, but not limited to crop production, particularly where the data collection, record keeping, and results of the analysis are available within the field or other land management zone.

BACKGROUND OF THE INVENTION

One problem with data collection and analysis associated with crop production and other land management activities is in identifying fields and field boundaries. This problem presents itself in various ways.

Another problem with data collection and analysis is the ability to collect data from a producer or other user and provide analysis of the collected information or other useful information to the producer or other user at the point and time of need. This problem also presents itself in various ways.

Another problem relates to creating electronic records for production information which are convenient for the producer or other user and provide a benefit to the producer or other user beyond the benefits of paper records.

Therefore what is needed are improved methods and systems for the collection, analysis, or use of land management information and agricultural production information.

BRIEF SUMMARY OF THE INVENTION

Generally the invention relates to methods for collection, analysis, or use of land management information such as, but not limited to agricultural production information. A method for automated location-based information recall includes determining a geoposition at a point using a geoposition determining mobile communication device, identifying a land management zone based on one or more predetermined land management boundaries and the geoposition of the point, and wirelessly communicating information about the land management zone between the geoposition determining mobile communications system and a remote site.

A method for making a representation of geolocation data includes identifying a first land management zone, determining a land management boundary for the first land management zone based on geolocation information, maintaining a record of the first land management zone and the land management boundary for the first land management zone, associating data with the first land management zone, and forming the representation of the geolocation data from the record of the first land management zone and the land management boundary for the first land management zone and the data.

A method for providing agricultural information to users includes receiving an electronic communication from an electronic device associated with a user, the electronic communication comprising a geoposition of the electronic device, determining a land management zone having boundaries containing the geoposition, and electronically communicating agricultural production information for the land management zone to the user.

A method of collecting data within a crop management zone regarding a plant condition and providing an analysis regarding the plant condition includes acquiring an image of a plant having the plant condition within the crop management zone using an electronic device, communicating the image of the plant to a remote location for analysis, analyzing the image of the plant at the remote location to determine the plant condition, and reporting the plant condition to the electronic device.

A method of collecting data within a land management zone regarding a physical condition associated with the land management zone and providing an analysis regarding the condition associated with the land management zone includes acquiring an image within the land management zone using an electronic device, communicating the image to a remote location for analysis, analyzing the image at the remote location to assist in determining the condition associated with the land management zone, and reporting the condition associated with the land management zone to the electronic device.

BRIEF DESCRIPTION OF THE DRAWINGS

FIG. 3 is a block diagram of a system for automatic location determination and field information recall.

FIG. 4A is a screen display identifying by name the field being entered.

FIG. 4B is an alert based on the genetics of seed planted in a field.

FIG. 4C is an alert based on expected weather conditions.

FIG. 5 is a block diagram illustrating representative types of data which may be available remotely.

DETAILED DESCRIPTION OF THE PREFERRED EMBODIMENT

Figure 1:
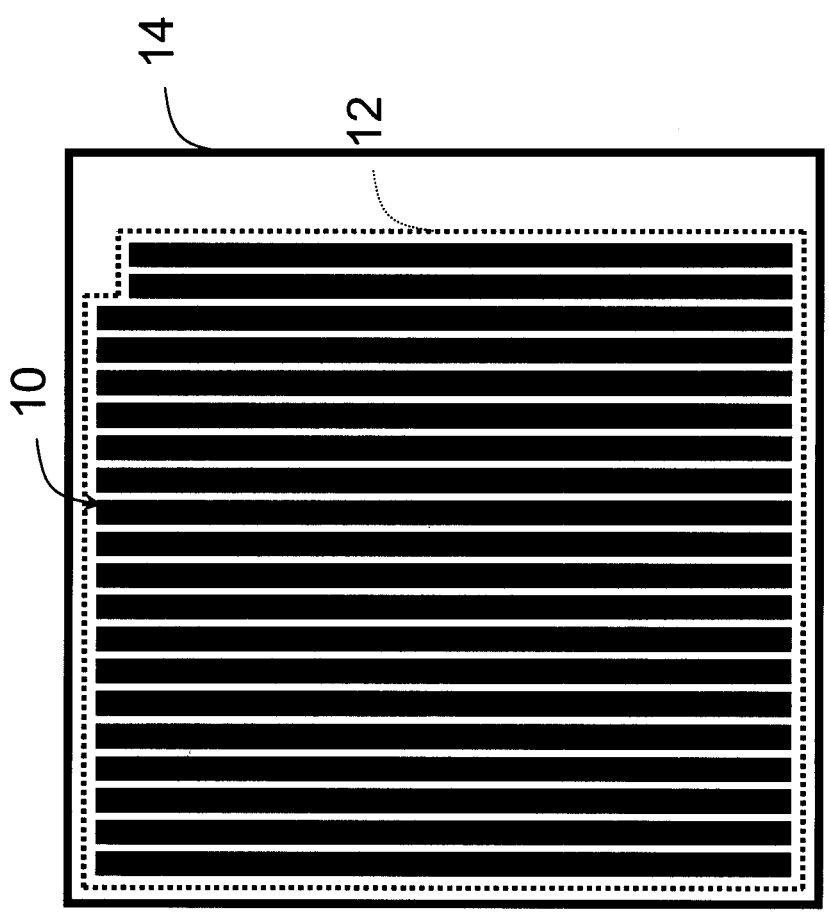
FIG. 1 is a pictorial representation of a field with boundaries determined using GPS data.

A GPS enabled device with wireless communications capability such as a cell phone, properly equipped personal digital assistant (pda), or properly equipped computer is used for collecting data within a land management zone such as a field or other crop management zone and communicating the data to a remote location. The data can then be stored at the remote location. A remote location is one that may be positioned outside of the land management zone and may be nearby or around the world. Alternatively, the data can be analyzed at the remote location and the results of the analysis can then be communicated back to the GPS enabled device at the field or other crop management zone or land management zone.

Such a system has numerous potential advantages. Because a GPS enabled device is used, geolocation information is collected which can be associated with the user's observations. The geolocation information can further be used to identify a land management zone or crop management zone associated with the geolocation information by determining which zone boundary the geolocation lies within. A single point may be located in multiple zones. Setting up or determining the zone boundaries can be done using GPS data associated with crop production operations such as planting or harvesting or other land management operations.

1. Determining Land Management Zone Boundaries

There are numerous uses of land management zones and boundaries both for crop production activities as well as other land management activities. Examples of other land management activities include establishing and maintaining land management zone boundaries for lands in the Wetland Reserve Program (WRP), the Conservation Reserve Program (CRP) or other types of government programs. In addition, defining land management zone boundaries may be useful in tracking soil type, soil moisture, soil temperature, and other information used in crop production or otherwise. Also, defining land management zone boundaries may be useful in tracking weather conditions such as precipitation, rainfall, snowfall, hail, wind speed, temperature, and other weather related conditions. Such information may be particularly useful in assessing crop conditions, and planning for crop production operations or activities. However, land management zone boundaries may be associated with various types of boundaries including those associated with refuge zones, parks, pastures, wooded habitats, wetlands, and other types of land management zones.

2. Determining Crop Management Zone Boundaries

One particular type of land management zone of interest are crop management zones and their boundaries. Although discussion regarding crop management zones is provided, it is to be understood that a land management zone need not be a crop management zone.

Boundaries for a field or other crop management zone are determined from geospatial data such as that collected from a GPS receiver. Field boundaries in the past have been determined in various ways, including by walking the boundaries of the field with a GPS receiver and plotting the boundaries. Another way of determining a field boundary is through the use of a geo-referenced map or aerial photo of a field in combination with selected GPS points which can then be used to determine the field boundaries through interpolation. However, both methods of determining crop management zone boundaries can be complex or inconvenient to implement and may result in errors in the determination of crop management zone boundaries.

Instead of these methods, GPS data collected during production operations, such as planting or harvesting, may be used to determine crop management zone boundaries. Alternatively, GPS data used to prescribe production operations can be used. The GPS data defines a number of different points within the field. The boundaries of this set of points is then determined. Where the GPS data is as-planted data, the boundaries then correspond with the actual planted field as opposed to the field as defined by fence boundaries, borders, grass waterways, or other portions of a field where crop is not planted. The GPS data may be that associated with an auto-steer system, such as an RTK auto-steer system from Trimble or auto-steer systems available from other manufacturers. Such systems can provide sub-inch accuracy for steering and are useful for determining boundaries of crop management zones. It should be appreciated that the number of acres planned for a planting may be different than the actual number of acres planted, for various reasons. For example, due to the turning radius of equipment used in planting, crop rows may be slightly shorter than planned. Cumulatively, less crops may be planted than planned for which can have various affects. For example, if yield is measured based on acres planned for and not actual acres planted, the computed yield per acre may be less than what the actual yield per acre is.

Where crop management zone boundary information is determined from as-planted information, as-planted mapping data may be collected from a producer. The data may be collected in various ways. One way is to copy the memory card information containing GPS data and where, when, and what was planted in each field. It should be appreciated that GPS data includes a time stamp so both where and when planting occurs can be determined directly from GPS data. From the GPS data, relatively accurate crop management zone boundaries may be determined.

FIG. 1 illustrates a map where as planted GPS data points 10 are presented as forming black dense regions whose collective boundary become the crop management zone boundaries in this case 12. Note that a fence line boundary 14 is also shown. The field boundary 12 is smaller in size than the fence line boundary 14. Of course, a crop management zone may be larger or smaller than a field.

2.1 Using Crop Management Zone Boundaries in Building Isolation Site Maps

One advantage of having accurate crop management zone boundary information is that the accurate field boundary information can be used for building isolation site maps. Isolation site maps may be useful for various reasons. For example, transgenic site maps are particularly important to a producer because due to government regulations or other concerns, a producer is required to or may otherwise desire to isolate transgenic sites from other crops. If a transgenic site is not sufficiently isolated from other non-transgenic sites, the non-transgenic sites may not meet relevant regulations. This may affect the value of the crops in the non-transgenic sites. Thus, there must be an appropriately sized isolation zone around each transgenic site. One problem encountered in determining an isolation zone for a transgenic site involves determining the location of the transgenic site. One prior art method for determining the location of a transgenic site is to walk the field in which the transgenic plants are planted with a GPS receiver and record different waypoints. Although this method works, it requires a significant amount of time to do. In addition, it introduces the possibility of human error.

Instead of requiring a person to walk or drive the perimeter of the field to determine geolocation information, the geolocation of the transgenic site may be determined by evaluating GPS data acquired during a field operation such as planting. Through evaluating the GPS data acquired during planting, boundaries for the field are determined. Where RTK auto-steer is used during planting the GPS data is particularly accurate, although auto-steer need not be used. Instead of using as-planted GPS data, data from other field operations could be used such as harvest GPS data. One of the benefits of as-planted data is that it corresponds with the actual locations where transgenic seed was planted and therefore the boundaries would be determined based on the most relevant information as opposed to historical field boundaries which may shift from year to year, or boundaries which are predetermined for crop planning purposes Once the field boundary information is determined, then the isolation zone can be computed. The isolation zone may be computed to extend a pre-determined distance from the field boundary. The particular pre-determined distance will depend upon how much isolation is required. Different crops in different growing environments may result in selection of different isolation distances.

In addition, there may be more than one field that requires isolation. The second field may be adjacent the first field or may be separated from the first field. Where there are multiple fields, an isolation zone is created which takes into account the location of the multiple fields. The isolation zone is one example of a crop management zone.

Figure 2:
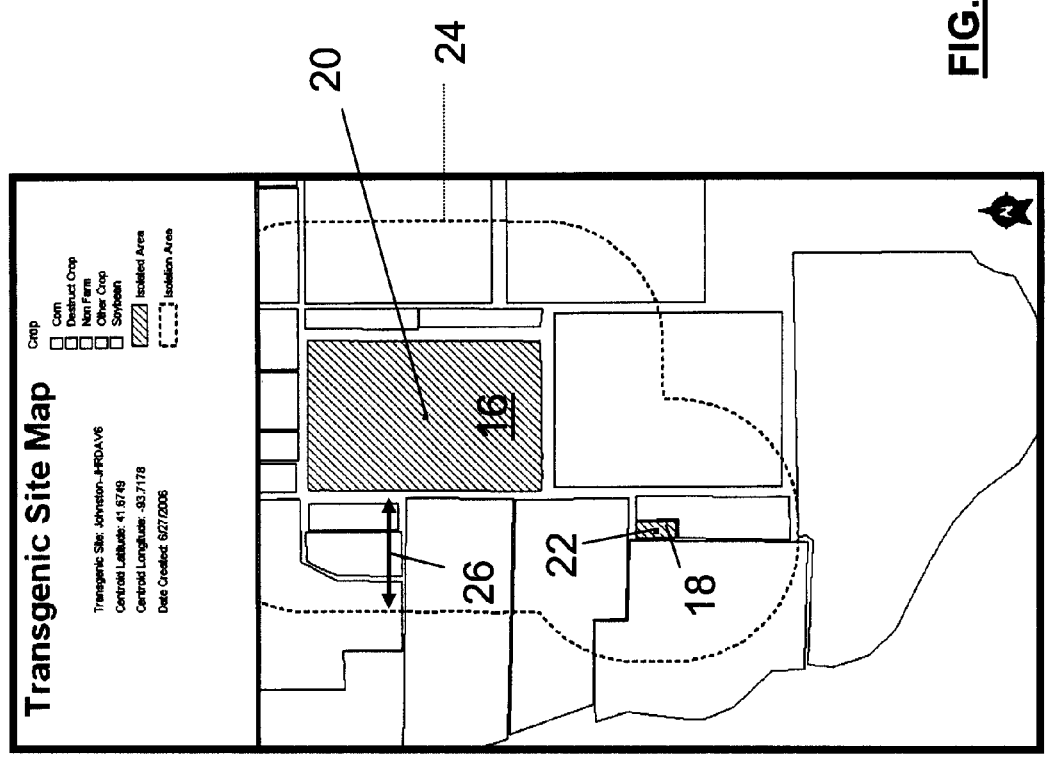
FIG. 2 is a transgenic site map.

FIG. 2 illustrates one example of a transgenic site map. A first field 16 contains transgenic plants and a second field 18 also contains transgenic plants. Note that the first field 16 is not adjacent the second field 18, but separated by a distance. The first field 16 has a centroid 20 having a centroid latitude and longitude. The second field 18 has a centroid 22 having a centroid latitude and longitude. An isolation boundary 24 is positioned around the first field 16 and the second field 18. The isolation boundary 24 is to separate the first field 16 and the second field 18 from areas outside of the isolation boundary by a predetermined distance 26.

In addition to transgenic site maps, isolation boundaries are useful in a number of ways. For example, isolation boundaries may be desirable to provide sufficient isolation from foreign pollen. Isolation distances may be useful, for example, to isolate wild sunflower patches, sweet corn patches, or otherwise assist in maintaining crop purity and preserving identity. Isolation boundaries may also be used in providing germplasm security.

2.2 Using Crop Management Zone Boundaries for Determining which Crop Management Zone a User is Located in Another benefit of having crop management zone boundary information is that this information can be used to identify which crop management zone a user is in at any given time if the geoposition of the user is known. For example, the user may carry on their person a GPS enabled cell phone which periodically or on their request sends their present GPS location to a remote location. At the remote location, the GPS location is processed to determine which crop management zone the GPS location is within or which crop management zone the GPS location is nearest. FIG. 3 provides a block diagram of such a system. In FIG. 3 a mobile device 30 includes a GPS receiver 32 and a transceiver 34 such as a cell phone transceiver. The mobile device 30 is operatively connected to a communication network 35 to which a computer 36 is operatively connected. The computer 36 is operatively connected to a remote database 38 which includes information concerning field boundaries. The computer 36 is adapted to receive a geoposition of the mobile device 30 and determine whether the geoposition falls within a particular field boundary or whether the geoposition is proximate a particular field boundary. The computer 36 may also relate information regarding the identity of the mobile device 30 or its user. Such information may be required for access.

As will be discussed later herein, being able to associate a GPS location with a crop management zone can be beneficial in that it allows observations by a user or other data collected by a user to be associated with a particular field and location within a field. Being able to associate a GPS location with a crop management zone can also be beneficial to provide information to a producer based on the crop management zone in which they are in.

3. Using Crop Management Zone Boundaries and/or Geoposition Providing Context-Based Messages Where a GPS-enabled device also provides for communications, a GPS location can be communicated to a remote location where the field or other crop management zone associated with the GPS location is looked up. For purposes of this example, a field is the crop management zone of interest. Based on the field, relevant information can then be communicated back to the GPS-enabled device and a user operating the GPS-enabled device. The information can include a name for the field. The information can also include alerts or reminders related to the field. Such information may be beneficial to the user in numerous ways. For example, if the user is an employee of a large producer or does custom farming for a large producer, the user may have limited knowledge and experience with the field. If an employee is told to apply herbicide on a field identified as "Gobbler's Knob", then when the employee reaches the field, they will receive verification that they are in fact in the field known as Gobbler's Knob. This message is shown in FIG. 4A. Alternatively, if the employee goes to the wrong field and then receives notification that they are entering the field known as the "South Bottom", then they will recognize they are not in the correct field.

In addition, based on the location, different contextual alerts and messages associated with the field may be communicated to the user based on their geoposition. For example, when the user reaches Gobbler's Knob, a message may appear which says, "Warning! Seed planted here does not include a glyphosate tolerance trait. DO NOT APPLY herbicide with glyphosates." This message is shown in FIG. 4B. Such an alert can assist in preventing damage to the crop. Thus knowledge of the particular seed product planted in the field and the traits of the seed product, including herbicide resistant traits, can be used to provide useful information at the growing point.

Another example of a contextual alert may be that based on the GPS location and known weather predictions. If heavy rain is forecast, a message may appear which says "Caution! Heavy rain expected. Do not spray." This message is shown in FIG. 4C. Thus knowledge of the geoposition and additional information allows potentially valuable contextual information to be provided to the user at the point and time of need.

To assist in providing contextual messages or alerts to the user, information other than the geoposition may be taken into account. This can include information such as historical weather conditions, predicted weather conditions, type of seed product, genetic traits of the seed product, known soil conditions, and other types of relevant information. In addition, to assist in providing contextual information the time of year relative to the planting date, growth cycle, or other information can be taken into account to help determine what the user's purpose for visiting the field may be. Alternatively, the user may be prompted to select their purpose for the visit to the field. This may be a part of the data collection described later herein.

FIG. 5 illustrates examples of different information available through the remote database 38 or otherwise. The data can include weather data 40, which may be historical weather data, predicted weather data, or other types of weather data. The weather data may include precipitation information, temperature information, photo-period information, or other types of weather-related data. Data may also include producer data 42. The producer data may be current data or historical data collected from the producer or otherwise. The producer may be able to access such information to update it. The data may also include relevant neighbor data 44. Neighbor data 44 may include data associated with nearby fields which may have information relevant to conditions of the present field. For example, the neighbor data may include an insect infestation of a nearby field, which may be relevant to the condition of the present field. Other types of data include pest data 46 which may include information regarding various types of insecticides, weeds, or diseases including the types of conditions which affect the likelihood of infestation. Genetic data 48 is also accessible. The genetic data may include information such as whether the plants being grown contain any particular disease resistant traits, herbicide resistant traits, or other traits which may affect production or diagnosis of the condition of plants within the field. The various types of data shown are merely representative as other types of data may also be used.

Where a GPS-enabled phone or other mobile device is used, a software application for the mobile device may be run by the user to determine the GPS position and communicate that position as well as other information. The communication may be made in any number of ways, including through messaging, including short message service (SMS) messaging, multimedia message service (MMS) messaging, enhanced message service (EMS), or other type of messaging. Of course, instead of such messaging protocols, a direct wireless communication link can be made for exchange of information where the mobile device supports such a communication link. The mobile device may support any number of protocols or wireless standards, including those associated with cellular communications, Wi-Fi, or other communication protocols or standards.

It is to be further understood that any number of security measures may be taken such that only authorized personnel are permitted access to the system. For example, such a system may provide permissions based on phone number. Thus, only information communicated from a device having an authorized phone number would be able to use the system. Instead of providing permissions based on phone number, other means may be used, including providing permissions based on other types of identifiers, access codes, or otherwise. It should be further appreciated that phone numbers or other identifiers associated with a producer or user can be associated with particular fields or sets of fields in order to provide additional context. Thus, for example, a warning may be provided to a user who is located within a field that is not associated with them.

It should further be understood that a producer may be able to access the same information through use of a web site or otherwise in addition to being able to access the information from their phone.

4. Collecting Data from a Producer Using a GPS Enabled Device

There are various methods available to producers to maintain field records. One approach frequently used is pen and paper. One problem with such an approach is that the records may be lost or misplaced and may not be readily available when a producer wishes to consult or update them. Another approach is to use a handheld device running software. One of the problems with such an approach is that use of such a system may require purchasing additional hardware and software. Another problem with such an approach is that such a system may require synchronization with a desktop system, such that not all records are necessarily available at any point in time. Also, a handheld device may be lost, stolen, or damaged resulting in loss of data. Another method of collecting field information involves equipping farm machinery with GPS receivers and other systems. Information is collected on memory cards which can then be read for data analysis or reporting purposes. Typically, in such a system, each piece of farm equipment will need to have its own data logging device which adds significantly to the expense and complexity of the system.

Instead of such systems, a producer may use a GPS-enabled cell phone or other GPS-enabled mobile communications device. Since many new cell phones come with GPS on-board and many producers use a cell phone, such a system eliminates the need to purchase additional data logging hardware and/or other external GPS units. In addition, because the GPS-enabled cell phone or other GPS-enabled mobile communications device provides for mobile communications information can be collected or accessed at the growing point or point of data collection.

In such a system a remote database can be used for storing information which is collected or accessed remotely. The remote database can be operated by an agricultural input supplier (such as, but not limited to a seed product supplier) or other party. Such a system may be particularly useful where multiple interested parties in the production process have full or limited access to information which is collected. In addition to the storage of the data remotely, remote analysis on collected data may be provided for and the results of such remote analysis communicated to the producer at the point where useful to do so. The approach of providing for remote storage also tends to eliminate training and maintenance issues associated with a dedicated system.

One type of field record is what is generally known as a crop plan. A crop plan typically includes a map, hand drawn, aerial or otherwise for a production operation and indicates the fields which are a part of the production operation. For each field there are acreages associated with the field. The crop plan at a minimum indicates what crops are to be planted in what fields. Also, the crop plan generally includes forecasting of the amount of seed needed, the amount or type fertilizer needed, pesticide requirements, or other agricultural inputs. The crop plan may be updated with actual amount of seed used, fertilizer applied, pesticides applied, or other information during the course of production.

Where the GPS-enabled mobile communications device is used, a producer can access crop plan information for any field and update it from the field simply and conveniently. Crop plans can be created and sent back and forth between the grower and another. Crop plans can be edited in real time and the actual as-applied plan can be seamlessly integrated back into a remote database and compared to the original crop plan. Such a system is advantageous in that it allows for crop plans to be modified quickly and conveniently at the growing point. It also provides for communicating the results of any modifications of a crop plan to other interested parties including agricultural input suppliers, agricultural product suppliers, agricultural service providers, landowners, equipment suppliers, other parties to a production contract, financial services providers, or other types of agricultural input suppliers.

It should be appreciated that because the mobile device is GPS enabled or can otherwise determine geoposition, the mobile device can identify the field in which it is located. This simplifies the process, avoids mistakes in associating data with the wrong field, and allows for not only creating a record of geoposition but also time coding of when information is entered into the system.

The system provides a user the ability to access and enter current and previous year's information regarding a field via a GPS enabled device. The information can include field characteristics, activities and field operations performed, products planted, products applied, harvest data, projected physiological maturity dates, basic financial information concerning the field or geographic region of interest. The user, when coming within close proximity of a field, can be prompted on the GPS enabled device to access field records for the respective field including the current season and previous season's records. The user is able to view information about the field, enter/edit additional information about the field and schedule activities to be performed on the field (such as, but not limited to herbicide application). In addition to general information about the growing crop, users can be signaled to indicate alerts on which specific pests might be present in the field (based on pest models and weather data) and links to additional information on how to scout for and manage those crop pests potentially predicted to be present. Where such an alert is given to a user, the user can then perform one or more steps necessary to acquire additional information and then update the database accordingly.

Currently, farm operators monitor the progress of their crops and make applications of products intermittently throughout the year by physically visiting the crops. When these visits occur, operators managing multiple fields need background information on the fields they visit to bring context to their observations. In addition, operators may enter a field with a piece of equipment expecting to make an application of a pesticide, fertilizer or perform a tillage operation. Due to the increased complexity of pesticide/genetic interactivity today (herbicide resistance, etc.), such a system allows the operator the ability to ensure they are in the correct field to perform a specific application and that the application is appropriate for what has been planted. In the absence of an automated monitoring system that automatically accesses field data, farm operators depend on hand-written records. Outside of written descriptions or pictures, hand written records lack the ability to ensure operators (or their designates) are in a correct field for note taking or for making appropriate applications of product.

The system offers a producer a convenient method to record and retrieve field information and to navigate themselves within fields and between fields. The system is based on a GPS enabled cell phone with a data logging/retrieval application that connects to a central database at a remote location. When a user enters a field, the GPS in the phone is triggered on by using a protocol which then retrieves the appropriate field data associated with the location of the user. The user can then collect data in real-time about the current field, or retrieve historical information such as a planting operation. Other information may also be available to the user from the phone, including the soil type the producer is standing on, weather data and forecasts, environmental classification, pest alerts, yield history, and other production related information. The producer would also have the ability to navigate back to places within a field to scout different hybrids, take stand counts, inspect for pests, or capture and upload photos from the field. When the producer leaves the field, the protocol may then trigger the phone to wirelessly send and store information back to the remote database which may be made available for editing and reporting online by the producer.

One of the further advantages that may be realized is that due to the remote analysis which may draw upon a number of different sources of data, the producer has access to more complete and accurate information than may be available than if they had their own independent system. This includes troubleshooting information. In addition, the producer is able to benefit from such access without requiring expensive hardware and software. In addition, the system streamlines the process of information exchange between the producer and others. Also, the system allows the producer to add to the available information to improve or fine tune any models used. For example, the remote database may access weather information to determine what expected weather conditions were for a field, including how much rain was received. However, it is known that the amount of rain received can vary significantly from what is predicted due to "spotty" showers. The producer monitoring the field may enter information regarding the rainfall the producer measured at the field or indicate that based on their observations the field received more or less rain than weather information indicated. Thus, in this manner, more accurate information about the field is obtained. Such information may be useful to the farmer or agricultural input supplier, or others.

It should further be appreciated that the electronic device may collect data with various types of sensors either directly or through a communications link with another device. For example, a device within the field may provide for BLUETOOTH, UWB, Wi-Fi, or other types of wireless communication and may then communicate with an electronic device associated with a user who is in a land management zone. Thus, for example, if there is a sensor network associated with the field for data collection purposes, information from the sensor network may be collected by the electronic device. Also, information collected or stored by equipment used in the field may be harvested by the electronic device.

5. Use of Camera Phone or Other Electronic Device for Data Acquisition and Remote Analysis To identify common pests today, farm operators typically receive training through a variety of means including industry publications, university newsletters, and internet sites. Another alternative to identify pests is to call a trained agronomist to the field for assistance. Training has become more expensive and time consuming. Scheduling a visit from an agronomist can also take time and not provide quick enough results. If certain pests reach threshold levels quickly, any delay in treatment can cause loss of yield or value of the crop planted. By providing electronic identification and potential management solutions, the system allows for less delay and potentially reduces overall crop loss from pests.

Examples of pests for corn include beetles, billbugs, sugarcane beetles, beet larvae, billbug larvae, corn rootworm, white grubs, wireworms, aphids, cornstalk aphids, cutworms, cornstalk borer, seed corn maggots, chinch bug, corn leaf aphids, spider mites, corn earworm, European corn borer, grasshoppers, armyworms, corn leafhopper, corn leaf miner, cucumber beetles, flea beetles, thrips. Of course, there are other possible pests.

Examples of diseases of corn include grey leaf spot, leaf blight, bacterial soft rot, charcoal rot, common rust, common smut (boil smut), corn stunt, exserohilum root rot, fusarium ear rot, fusarium stalk rot, head smut, maize dwarf mosaic, pythium stalk rot, seed rots and damping-off. Of course, there are other possible diseases as well. Other types of crops may share some of the same types of pests and diseases. Other types of crops may also be susceptible to different types of pests and diseases.

The system provides users with the ability to capture an image of a pest, disease or damaged plant and submit it to an image-matching database for identification. Once an image is received, an imaging program performs a search against a database of pests, disease and plant damage and return likely results to the users. Images can be submitted to the imaging program via a PC or a mobile device, including a cell phone. In addition to receiving results of the search electronically, the user also may receive relevant scouting and further identification steps, followed by control or management information regarding the issue. If desired, the user could also schedule a personal visit to the geolocation by a service agent for further review. Also, if desired, the user can schedule treatment for the target pest with a retailer of their choice.

In order to use such a methodology, the producer acquires an image of the condition such as by using the camera of a camera phone. The camera phone may also be GPS enabled so that geospatial data regarding where the image is acquired can be determined. The location can then be correlated to a particular field as previously explained. Alternatively, a producer can otherwise identify the field or location or select a field or location from those associated with the producer. The image is then electronically communicated to a remote location. At the remote location the image is analyzed using image processing techniques to identify the condition of the plant whether diseased, pest infested, or otherwise. This image analysis can be performed using any number of known image processing techniques including, without limitation, noise reduction, edge detection, segmentation, feature extraction, and object recognition. In addition, the image analysis may be aided by a library of images for known conditions for the plant which can be used to compare features of the image being analyzed and the library images. In addition to the image analysis, other data may be considered in order to provide a diagnosis of the plant condition. This other data provides additional context and may include the location at which the image is acquired, current or historical production information about the field in which the image is acquired, knowledge of the seed product planted, pesticides used, tillage practices, conditions diagnosed in nearby locations, and other information. The additional information helps in the diagnosis as it may suggest potential diagnoses or suggest diagnoses which should be precluded.

For example, if the crop being grown is corn and was corn the previous year (corn-on-corn) then the likelihood of certain conditions is more prevalent. If the crop is known to be genetically resistant to certain conditions, then the likelihood of such conditions is lessened. If there is a known infestation in the area, then the condition may be more likely to be due to the same infestation. Thus, in all of these cases, the diagnosis need not solely rely upon the imaging analysis, but can incorporate all knowledge available which is relevant to the diagnosis.

Figure 6:
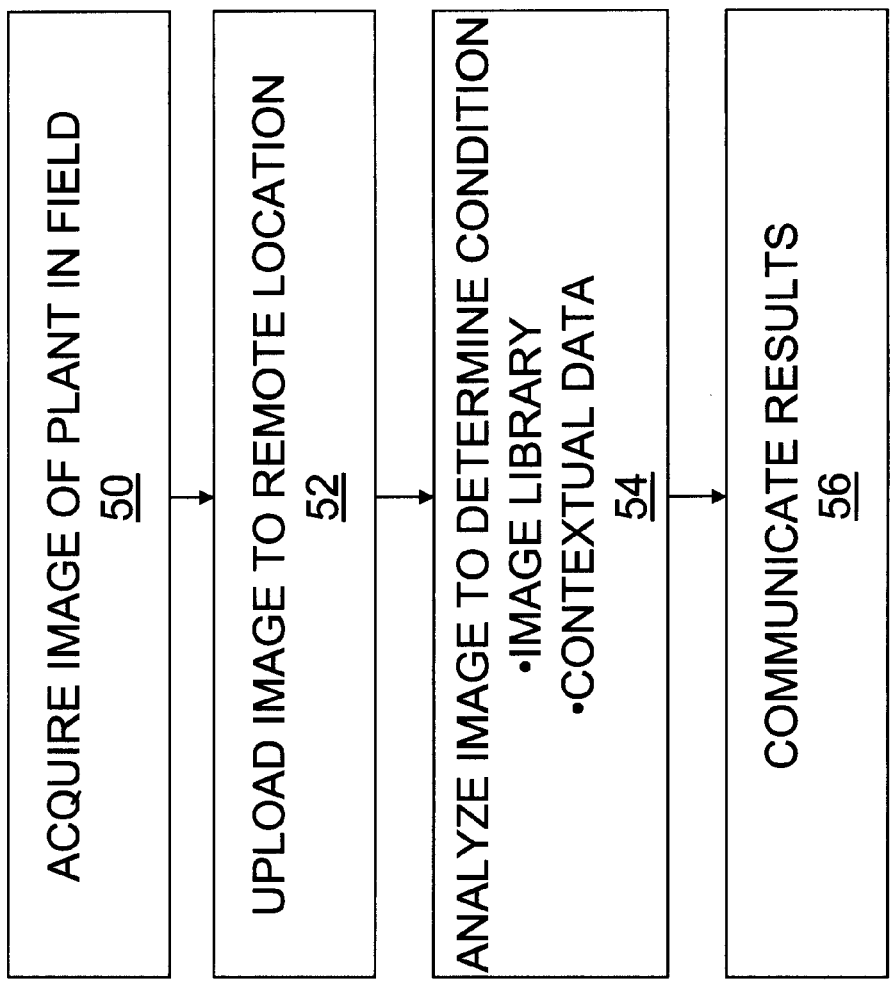
FIG. 6 is a block diagram illustrating one methodology which may be used to identify a pest condition.

FIG. 6 illustrates one methodology. In step 50, an image of a plant is acquired in the field. The image may be acquired using a GPS enabled camera phone so that a geoposition of the plant and field can be communicated to a remote location as well as the image. In step 52, the image is uploaded to a remote location. In step 54, the image is analyzed to determine the plant condition of one or more plants within the field. The analysis may be based on an image library as well contextual data about the field which may assist in diagnosing the conduction. Once a diagnosis is made, the diagnosis is electronically communicated to the producer in step 56. In addition to the diagnosis, the producer may be presented with additional information. The additional information may include an image of a plant with the diagnosed condition from a library of such images so that the producer can compare this image with what is present in their field. This allows the producer to confirm that the diagnosis made is correct and also increases their confidence in the system, even with respect to conditions which they are not particularly familiar with. It also provides a way to verify that the correct diagnosis was given as the producer can then compare an image of the known condition to the observed condition and verify that the diagnosis was correct, even though they are not personally familiar with the diagnosed condition. The additional information may also include treatment information or prompts for further information which can be used to prescribe a treatment. For example, the further information can relate to the extent of the condition—is the plant condition isolated or is present in 30 percent of the field, 50 percent of the field, or 100 percent of the field? The further information can then be used as necessary to prescribe an appropriate treatment.

The additional information may be a recommendation that an agronomist or other trained professional inspect the field before other action is taken. Alternatively, the additional recommendation may be a recommendation for a chemical treatment. In either case, a request for the field visit or treatment program may be made immediately. It should be appreciated that this allows for a rapid response to an identified condition and is convenient for the producer.

Figure 7B:
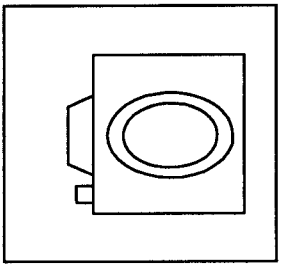
FIG. 7B is a representative screen display indicating an analysis of a crop condition based on an image of a crop condition.
Figure 7A:
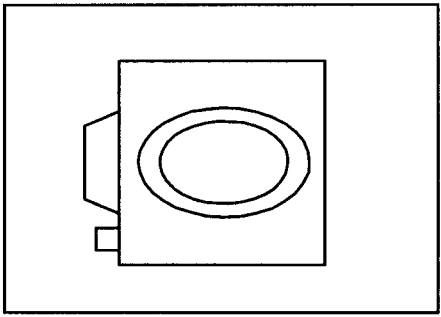
FIG. 7A is representative screen display for sending an image indicative of a crop condition.

FIG. 7A and FIG. 7B illustrate embodiments of a screen display on a phone or other mobile communications device. In FIG. 7A, an image is associated with a geolocation. In FIG. 7B, results of the remote analysis of the image are shown to a user to indicate whether their observations are consistent with the analysis.

Data acquisition and analysis may be used for other purposes as well. For example, data acquisition and analysis may be performed for monitoring the growth stage of a plant. Correctly identifying the growth stage of a plant is useful for in a number of ways. For example, application of chemical agents may require that a particular growth stage be reached. A gene switch may be associated with a particular growth stage and therefore the growth stage may need to be monitored.

6. Defining of Crop Management Zones

Using a GPS enabled device, producer may also define crop management zones while they are in the field. A crop management zone is an area or space associated with crop management related information. A producer may choose to define their own crop management zones for any of a variety of reasons, including based on production practices, applied to different areas, observations about different areas, such as, but not limited to, agronomic conditions, plant growth conditions, environmental conditions, or other types of observations. A producer may define or use any number of different crop management zones. Any point may be associated with any number of crop management zones. Different types of crop management zones may be represented in layers and any number of layers may be used.

Figure 8B:
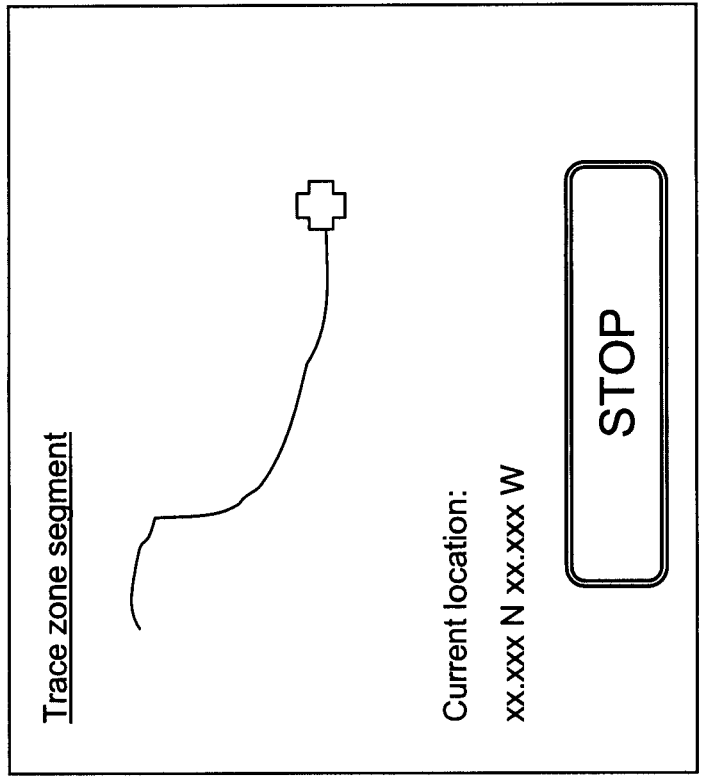
FIG. 8A-8D are representative screen displays used for defining crop management zones.
Figure 8A:
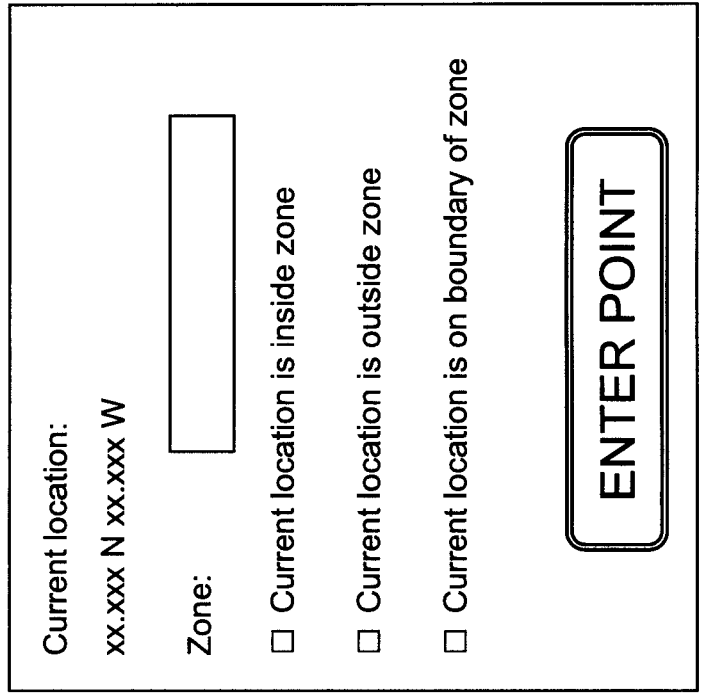

A producer may use a GPS-enabled device to assist in the defining of crop management zones. The producer may define an area in various ways. FIG. 8A provides a screen display for a GPS enabled device. As shown in FIG. 8A, a current location of a point associated with the GPS enabled device is given, such as by latitude and longitude. A producer may select a zone associated with the point, such as indicating that the current location is inside the zone, the current location is outside the zone, or the current location is on the boundary of the zone. The information from one or more points may be used to define the zone. Only one point is needed where the point is the zone. There are other ways to define a zone as well. FIG. 8B illustrates a screen display for a GPS enabled device for a mode which traces a zone or zone segment. In such a mode, the user may walk around the zone or a portion of the zone to define a boundary for the zone. FIG. 8C indicates that the zone segment traced may be combined with one or more additional zone segments or overlayed with one or more additional zones to assist a producer in defining zones. Thus, for example, the boundary of a field may already be defined and the zone being defined is a portion of the field. The producer need not trace the complete boundary for the zone being defined. Instead, the producer need only trace a segment of the zone and combine this segment with the already established boundary of the field in order to establish one or more zones.

Figure 8D:
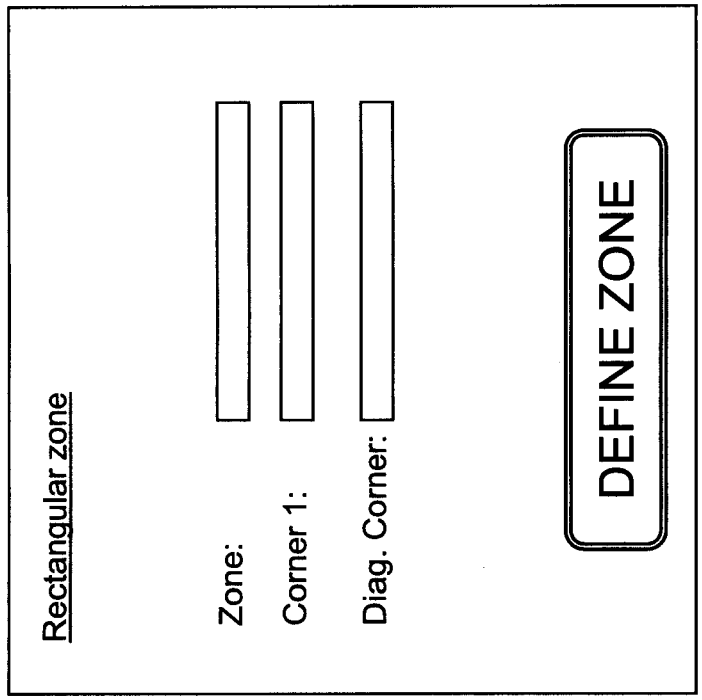
Figure 8C:
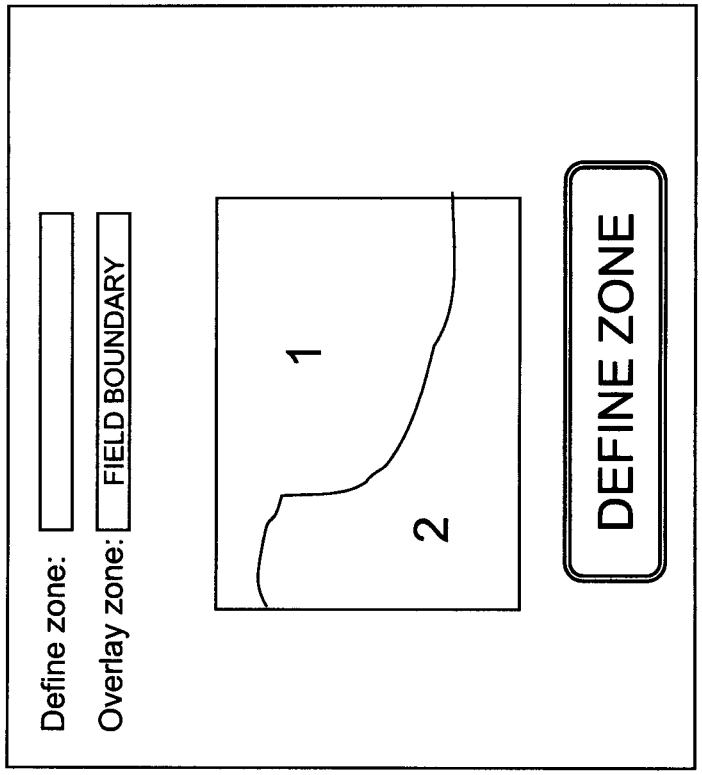

Another way in which a zone may be defined by a producer is shown in FIG. 8D. Where the zone is a rectangular zone, a producer need only define two opposite or diagonal corners of the field. Of course, other methods may be used for a producer to define a zone, including methods based on the shape of the zone to be defined, existing zones that may have segments that may be used to define a portion of the field. In addition, zones may be automatically created based on data associated with different points. It should be further understood that, although a producer may be able to create zones while in the field, the producer or others may be able to create zones at other times. In addition, to assist in creating zones at a later time, the GPS enabled device may prompt the producer to collect data (including location data) while at the field so that such information may be used at a later time in order to create zones. In addition, although zones are generally described as two-dimensional areas, a zone may be three dimensional such as a 3-D space.

It should further be clear that not only producers may use the methods and systems described herein, but also other users, including landlords, workers, consultants, crop scouts, field service representatives, and others.

Therefore, automated field information methods and system have been described. It is to be appreciated that the present invention is not limited to the specific disclosure provided herein, but describes numerous variations, options, and alternatives.

What is claimed is:

1. A method comprising:
   receiving geoposition data that was collected during a production operation for at least one crop, wherein the geoposition data includes an indication of a location of the at least one crop located in a crop management zone;
   determining crop management boundaries of the crop management zone in which the at least one crop is located based on the location of the at least one crop indicated in the geoposition data that was collected during the production operation for the at least one crop;
   receiving a geoposition associated with a mobile communication device;
   identifying the crop management zone based on a proximity of the received geoposition associated with the mobile communication device to the determined crop management boundaries of the crop management zone; and
   sending information about the crop management zone to the mobile communication device.

2. The method of claim 1 further comprising analyzing agriculture production information associated with the crop management zone.

3. The method of claim 1 further comprising receiving agricultural production information about the crop management zone.

4. The method of claim 1 wherein sending information about the crop management zone comprises sending at least one of genetics of plants growing in the crop management zone, crop production information associated with the crop management zone, weather data associated with the crop management zone, an image of at least one plant, an image of at least one condition, or an image analysis of at least part of the crop management zone.

5. The method of claim 1 further comprising:
   receiving a digital image associated with the crop management zone; and
   analyzing the digital image to determine a condition of at least one plant within the crop management zone, and wherein the information about the crop management zone comprises the condition of the at least one plant.

6. The method of claim 5 wherein determining the condition of the at least one plant comprises determining a disease or pest affecting the at least one plant.

7. The method of claim 1 wherein one or more of said crop management boundaries are determined by analysis of as-planted data and wherein said one or more crop management boundaries comprise an isolation zone that extends a predetermined distance from the location of the at least one crop located in the crop management zone to determine whether the at least one crop is isolated from other crops outside of the crop management zone.

8. The method of claim 1 wherein the mobile communication device comprises a GPS enabled cellular phone.

9. A method comprising:
   receiving a geolocation of at least one crop located in a crop management zone, wherein the geolocation is associated with a geoposition determining mobile communication device;
   defining a crop management boundary associated with the crop management zone based on data that was collected during crop production and the geolocation of the at least one crop associated with the geoposition determining mobile communication device;
   storing the crop management zone and the defined crop management boundary associated with the crop management zone;
   associating an isolation boundary with the crop management zone; and
   determining the representation of the geolocation data from the stored crop management zone and crop management boundary associated with the crop management zone and the isolation boundary.

10. The method of claim 9, wherein the crop management zone comprises a first crop management zone and the crop management boundary comprises a first crop management boundary, and further comprising identifying a second crop management zone corresponding with planting of a plant genotype and determining a second crop management boundary for the second crop management zone.

11. The method of claim 10 wherein the first crop management zone is separated from and not adjacent to the second crop management zone.

12. The method of claim 9 wherein the step of defining the crop management boundary associated with the crop management zone is performed by analyzing GPS data acquired during planting of the crop management zone.

13. A method comprising:
   receiving geoposition data that was collected during a production operation for at least one crop, wherein the geoposition data includes an indication of a location of the at least one crop located in a crop management zone;
   determining crop management boundaries of the crop management zone based on the location of the at least one crop indicated in the geoposition data that was collected during the production operation for the at least one crop;
   receiving a geoposition associated with an electronic device;
   determining that the crop management zone having the crop management boundaries contains the geoposition;
   electronically communicating agricultural production information associated with the crop management zone to the electronic device; and
   electronically receiving from the electronic device agricultural production information about the crop management zone.

14. The method of claim 13 wherein the information comprises at least one of an alert indicating that a user is within the crop management zone, an alert indicating that a production operation should not be performed in the crop management zone, or additional information containing user observations about the crop management zone.

15. A method comprising:
receiving a geolocation of at least one crop located in a crop management zone, wherein the geolocation was collected during a production operation for the at least one crop;
determining crop management boundaries of the crop management zone based on the geolocation of the at least one crop collected during the production operation for the at least one crop;
receiving an image of a plant having a plant condition within the crop management boundaries of the crop management zone from an electronic device;
receiving geospatial data, associated with the image of the plant, that is indicative of a reason the plant has the plant condition;
analyzing the image and the geospatial data of the plant to determine the plant condition; and
transmitting the plant condition to the electronic device.

16. The method of claim 15 further comprising sending treatment information associated with the plant condition to the electronic device.

17. The method of claim 16 further comprising receiving a request from the electronic device for scheduling of a service to treat the plant condition.

18. The method of claim 15 wherein the plant condition comprises at least one of a presence of a pest, a nutrient deficiency, a biotic condition, or an abiotic condition.

19. A method comprising:
receiving a geolocation of at least one crop located in a crop management zone, wherein the geolocation was collected during a production operation for the at least one crop;
determining crop management boundaries of the crop management zone based on the geolocation of the at least one crop collected during the production operation for the at least one crop;
receiving an image associated with at least one part of the crop management zone from a mobile communication device, wherein the at least one part of the crop management zone associated with the received image is included within the crop management boundaries;
receiving geospatial data, associated with the image, that is indicative of a reason the crop management zone has a condition;
analyzing the image and the geospatial data to assist in determining the condition associated with the crop management zone; and
transmitting the condition associated with the crop management zone to the mobile communication device.

20. The method of claim 19 further comprising sending treatment information for the condition associated with the crop management zone to the mobile communication device.

21. The method of claim 19 further comprising receiving a request from the mobile communication device for scheduling of a service to treat the condition associated with the crop management zone.

22. The method of claim 19 further comprising:
receiving additional data collected within the crop management zone from the mobile communication device, wherein the mobile communication device is adapted to receive the additional data through wireless communication with a sensor network; and
analyzing the additional data to assist in determining the condition associated with the crop management zone.

23. The method of claim 9 wherein the isolation boundary extends a pre-determined distance from the geolocation of the at least one crop located in the crop management zone to determine whether the at least one crop is isolated from other crops outside of the crop management zone.

24. The method of claim 13 wherein the electronic device comprises a GPS-enabled cell phone.

25. The method of claim 15 wherein the electronic device comprises a GPS-enabled cell phone.

* * * * *